United States Patent
Goossen et al.

[19]

[11] Patent Number: 6,002,513
[45] Date of Patent: Dec. 14, 1999

[54] OPTICAL MODULATOR PROVIDING INDEPENDENT CONTROL OF ATTENUATION AND SPECTRAL TILT

[75] Inventors: Keith Wayne Goossen, Aberdeen; Wayne Harvey Knox, Holmdel, both of N.J.

[73] Assignee: Lucent Technologies Inc., Murray Hill, N.J.

[21] Appl. No.: 09/102,514

[22] Filed: Jun. 22, 1998

[51] Int. Cl.⁶ .............................. G02B 26/08; H04J 14/02
[52] U.S. Cl. ...................... 359/291; 359/124; 359/134; 359/181; 359/223; 359/224; 359/290; 359/295; 359/318
[58] Field of Search ...................... 359/124, 134, 359/181, 223, 224, 290, 291, 295, 318, 341

[56] References Cited

U.S. PATENT DOCUMENTS

| | | | |
|---|---|---|---|
| 5,225,922 | 7/1993 | Chraplyvy et al. | 359/124 |
| 5,500,761 | 3/1996 | Goossen et al. | 359/290 |
| 5,519,796 | 5/1996 | Li et al. | 385/24 |
| 5,530,584 | 6/1996 | Myslinski et al. | 359/341 |
| 5,541,766 | 7/1996 | Mizrahi et al. | 359/337 |
| 5,596,661 | 1/1997 | Henry et al. | 385/24 |
| 5,696,615 | 12/1997 | Alexander | 359/134 |
| 5,825,528 | 10/1998 | Goossen | 359/291 |

*Primary Examiner*—Georgia Epps
*Assistant Examiner*—Margaret Burke
*Attorney, Agent, or Firm*—Mathews, Collins, Shepherd & Gould, P.A.

[57] ABSTRACT

An optical modulator comprises at least two optically coupled MARS modulators, at least one having positive spectral tilt and at least one having negative spectral tilt. Both tilt and attenuation can be independently controlled by adjusting the air gaps of the constituent modulators. Preferred designs present linear spectral tilt.

7 Claims, 5 Drawing Sheets

OPTICAL MODULATOR PROVIDING INDEPENDENT CONTROL OF ATTENUATION AND SPECTRAL TILT

FIELD OF THE INVENTION

This invention relates to optical modulators and, in particular, to an optical modulator providing independent control of attenuation and spectral tilt.

BACKGROUND OF THE INVENTION

Optical modulators for equalizing the power across spectral ranges are important components in optical networks employing multiple wavelengths of light (Wavelength Division Multiplexed or WDM networks). Typically in WDM networks, especially in long-haul fibers, rare earth doped fiber amplifiers are used to replenish losses. In order to minimize non-linear effects in these amplifiers and to permit the use of common communication circuitry for all channels, it is necessary that the various wavelength channels have similar power levels. However, as various wavelengths are added or subtracted at various nodes in the network, the power levels of the various channels change, in turn changing the gain spectrum of the amplifiers. Such network changes can be slow as when customers are added and removed or fast as when network traffic is dynamically rerouted for improved efficiency. Often the variation in power is roughly monotonic in wavelength and can be adequately compensated by a monotonic change in attenuation as the wavelength changes, i.e. by a spectral attenuation tilt.

U.S. Pat. No. 5,500,761 issued to K. W. Goossen et al on Mar. 19, 1996 describes a Mechanical Anti-Reflection Switch modulator (MARS modulator) useful for power equalization. The MARS modulator is basically a Fabry-Perot cavity comprising the air gap between an optical membrane and a substrate. Modulation is based on voltage-controlled vertical movement of the membrane in relation to the substrate. The MARS modulator provides broad spectrum, high contrast reflection modulation at rates in excess of several Mbit/sec. A MARS modulator having low insertion loss and broad operating bandwidth particularly advantageous for optical communications applications is described in applicant Goossen's copending U.S. patent application Ser. No. 08/901,050 filed Jul. 25, 1997 and entitled "Micromechanical Modulator Having Enhanced Performance". Both U.S. Pat. No. 5,500,761 and application Ser. No. 08/901,050 are incorporated herein by reference.

Referring to the drawings, FIG. 1 is a schematic cross section of a single unit MARS modulator of the type described in the Goossen patent and copending application. The device 9 comprises a substrate 10 and a membrane 15 spaced from each other to define a gap 20 between them. The substrate 10 is a conductive material such as doped silicon, and the membrane 15 comprises one or more layers of conductive material such as an overlayer 15a of silicon nitride and an underlayer 15b of polycrystalline silicon. The overlayer has an index of refraction approximately equal to the square root of the substrate refractive index and the underlayer has an index of refraction approximately equal to the substrate refractive index. The thicknesses of 15a and 15b are each less than one-quarter of the operating wavelength $\lambda$. The membrane 15 and the substrate 10 are spaced apart by a peripheral support layer 12 of insulating material. Electrodes 30 and 31 permit connection of the membrane 15 and substrate 10, respectively, to the terminals of a bias voltage source 29.

The air gap 20 can be controlled by a bias voltage between the substrate and the membrane. Relative reflective maxima are produced when the gap 20 is an odd integer multiple of one-quarter of the operating wavelength $\lambda$. Minima are produced when the gap 20 is 0 or an even integer multiple of $\lambda/4$.

The modulator can employ mirrors of unequal reflectivity to provide broad operating bandwidth with low insertion loss. A high reflectivity membrane provides low insertion loss while a lower reflectivity substrate maintains the broader bandwidth of a low finesse device.

While these MARS modulators can be used to achieve a desired level of attenuation at the middle wavelength of a spectral band, this attenuation is typically produced by only one spacing between the membrane and the substrate, which means that the attenuation versus wavelength characteristic (spectral tilt) is fully defined. Thus there is no independent control over the attenuation and the spectral tilt.

SUMMARY OF THE INVENTION

In accordance with the invention, an optical modulator comprises at least two optically coupled MARS modulators, at least one having positive spectral tilt and at least one having negative spectral tilt. Both tilt and attenuation can be independently controlled by adjusting the air gaps of the constituent modulators. Preferred designs present linear spectral tilt.

BRIEF DESCRIPTION OF THE DRAWINGS

The nature, advantages and various additional features of the invention will appear more fully upon consideration of the illustrative embodiments to be described in detail in connection with the accompanying drawings. In the drawings.

It is to be understood that these drawings are for purposes of illustrating the concepts of the invention and are not to scale.

DETAILED DESCRIPTION OF THE DRAWINGS

Figure 1:
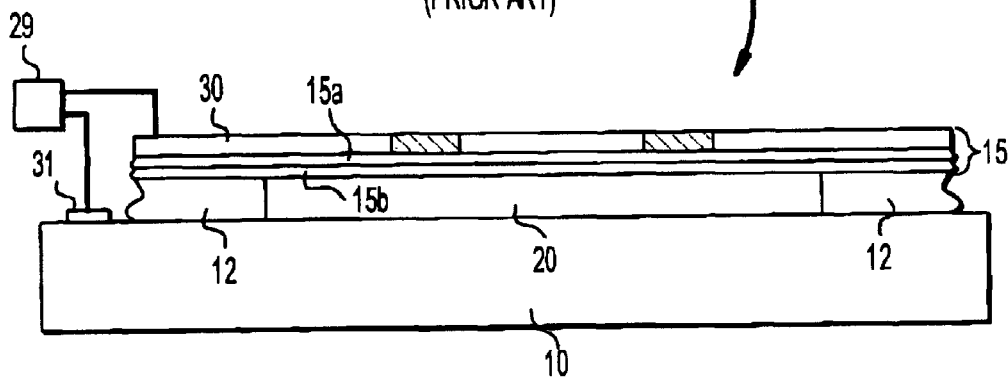
FIG. 1 is a schematic cross section of a conventional MARS modulator unit.
Figure 2:
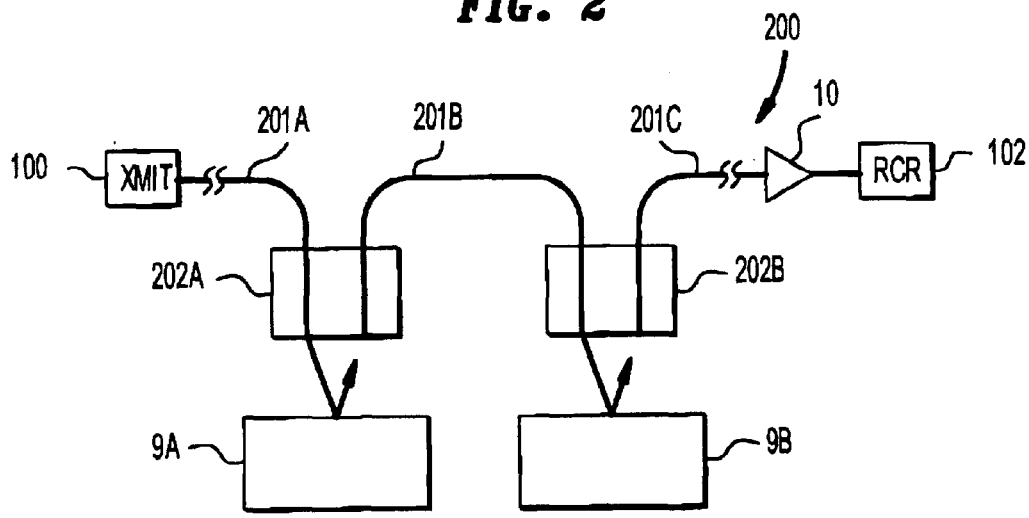
FIG. 2 schematically illustrates a first embodiment of an optical modulator providing independent control of attenuation and spectral tilt.

FIG. 2 schematically illustrates, in the context of a WDM optical communication system, an optical modulator 200 for providing independent control of attenuation and spectral tilt. The modulator 200 comprises at least two MARS modulator units 9A and 9B optically coupled in series on a light path defined by optical fiber segments 201A, 201B and 201C. One of the MARS modulators, e.g. 9A, is designed for positive spectral tilt of light near the operating wavelength $\lambda$ and the other, e.g. 9B, is designed for negative tilt.

Advantageously, fiber segments 201A and 201B are disposed in a first dual-fiber ferrule photonics package 202A as described in co-pending application Ser. No. 08/688,178 filed by Feuer et al on Jul. 26, 1996 and assigned to applicants' assignee. This application is incorporated herein by reference. Light from segment 201A reflects from unit 9A to segment 201B. Similarly, the other end of segment 201B and segment 201C are disposed in a second dual-fiber ferrule package 202B. Light from 201B reflects from unit 9B to segment 201C.

By control of the voltages from bias sources 29A and 29B, the respective air gaps of units 9A and 9B can be adjusted to provide independent control of the attenuation and the spectral tilt. Linearity can be optimized by selection of the membrane layer thicknesses.

It is contemplated that one use of this modulator is in conventional WDM systems. Such systems, in essence, comprise a WDM transmitter 100, one or more optical fiber amplifiers such as an erbium-doped amplifier 101 and a WDM receiver 102. Multiplexers and demultiplexers (not shown) are provided for adding and dropping channels at various points along the system. The modulator 200 is added to compensate spectral tilt of the WDM signal at any point in the system, but preferably before it enters an amplifier 101.

Figure 3:
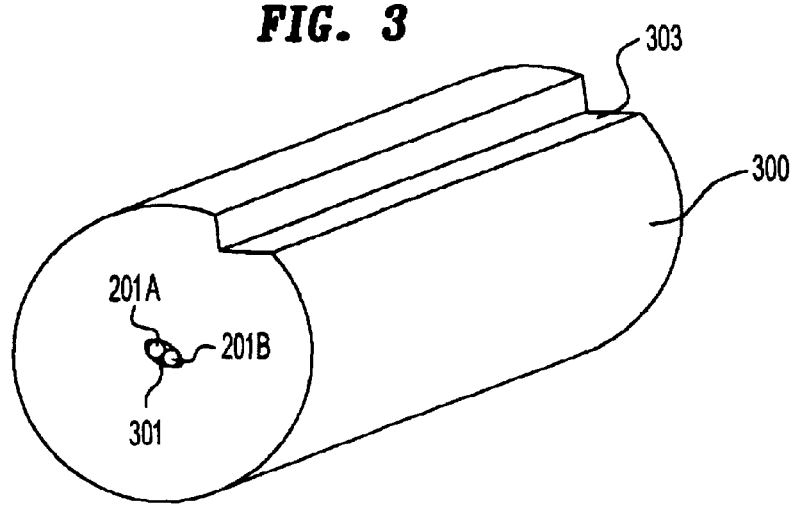
FIG. 3 illustrates a preferred form of the dual-fiber ferrule package useful in the embodiment of FIG. 2.
Figure 4:
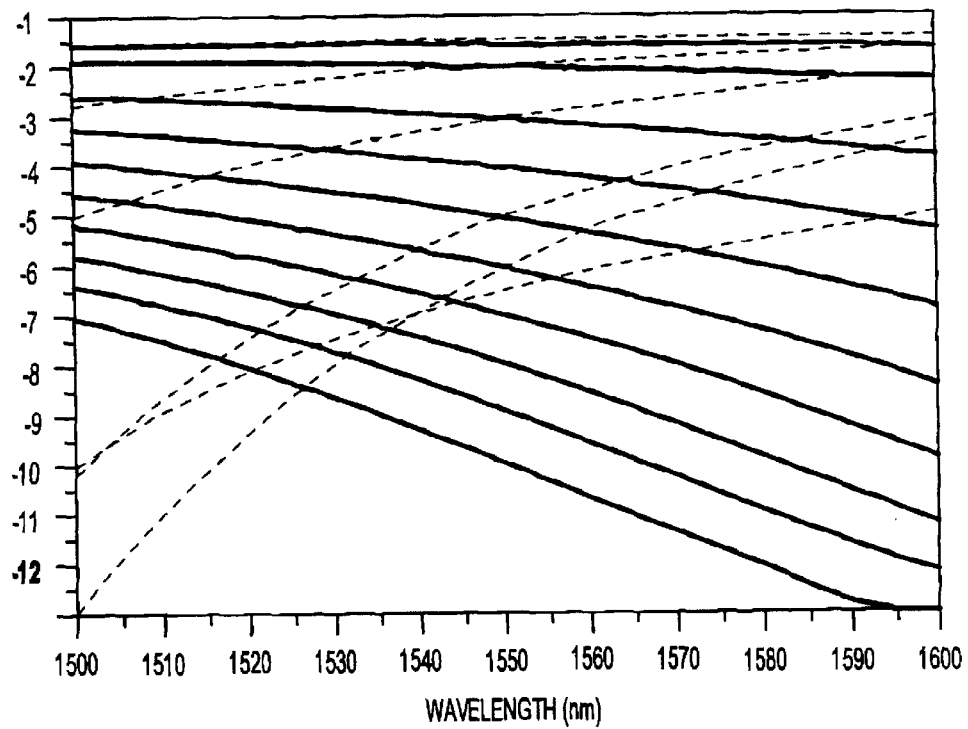
FIGS. 4 and 5 are graphical illustrations useful in understanding the operation of the modulator of FIG. 2.

FIG. 3 illustrates a preferred form of the dual fiber ferrule package for use in the embodiment of FIG. 2. In essence, a rigid retaining member 300 having a longitudinal axis of symmetry is provided with a hole 301 on the axis of symmetry. The hole 301 has a size sufficient for receiving two fiber segments (e.g. 201A and 201B) in tight fitting contact. Advantageously, hole 301 is elliptical in cross section to orient the direction between the two fiber centers, and a registration feature 303 is provided on member 300 to indicate the orientation.

The design and operation of the FIG. 2 device can be better understood by consideration of the following specific examples.

EXAMPLE 1

A positive tilt modulator unit using a silicon substrate and a silicon nitride/polysilicon membrane was designed to move among air gaps between 14,760 angstroms and 11,700 angstroms and a negative tilt unit of similar materials was designed for air gaps between 10,770 angstroms and 8,080 angstroms. FIG. 3 shows as dashed lines the reflectivity versus wavelength characteristics of the positive tilt unit at various air gaps. It shows as solid lines similar characteristics for the negative tilt device.

Figure 5:
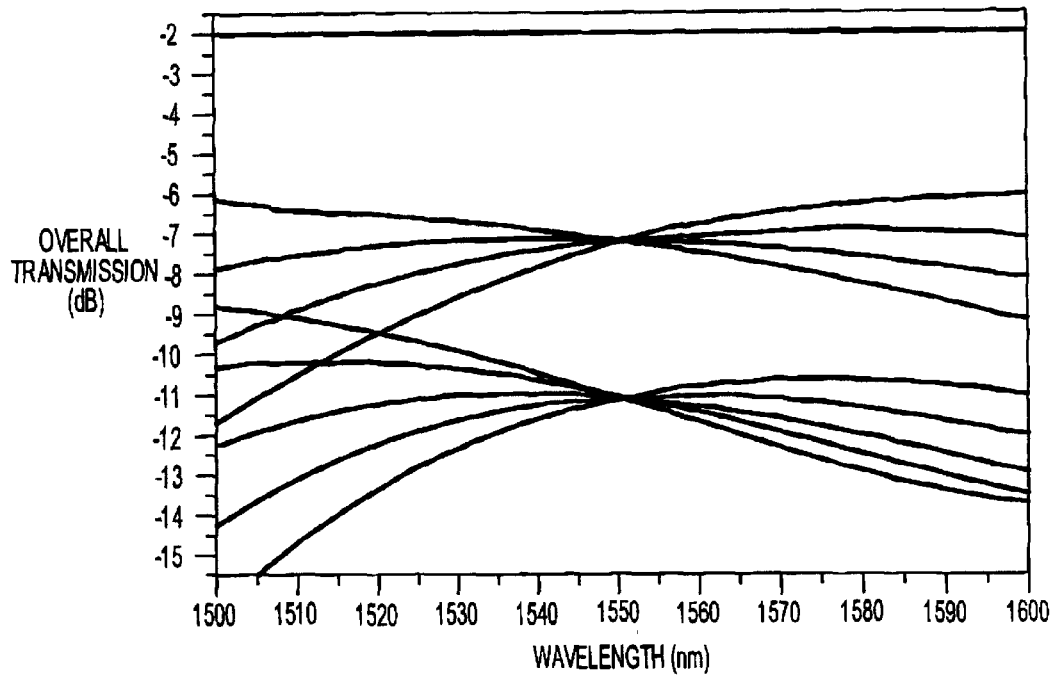

When the two devices are placed in series, they can be biased to produce different net attenuation at the operating wavelength and, for each attenuation, different spectral tilts. FIG. 5 illustrates typical overall transmissions as functions of wavelength for the device formed by cascading the two described modulator units. For each of two different attenuations at 1550 nm, there are plural spectral tilts ranging from positive to negative. It may be noted that the spectral tilts are only approximately linear.

EXAMPLE 2

A positive tilt modulator unit using a silicon substrate and a silicon nitride/polysilicon membrane was designed to move among air gaps between 15,010 and 11,950 angstroms. A similar negative tilt modulator was designed to move among air gaps between 10,480 and 8,620 angstroms. Curves similar to FIG. 5 were generated.

Figure 6:
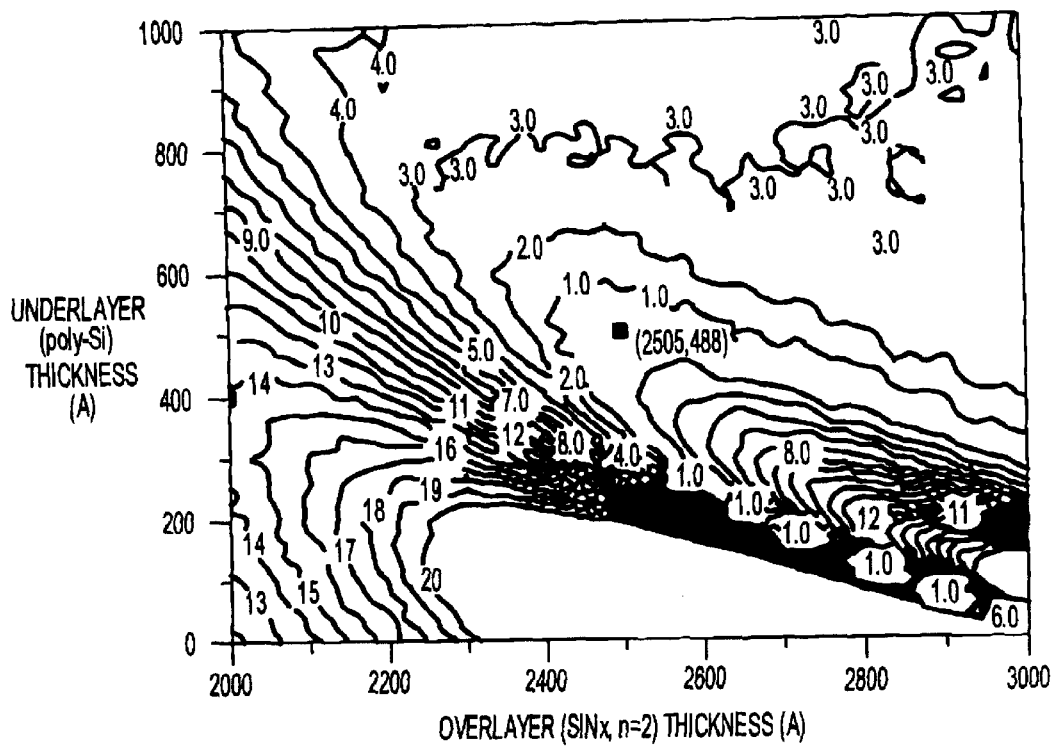
FIG. 6, FIG. 7, and FIG. 8 are graphical illustrations useful in understanding how to design a device with linear spectral tilts.
Figure 7:
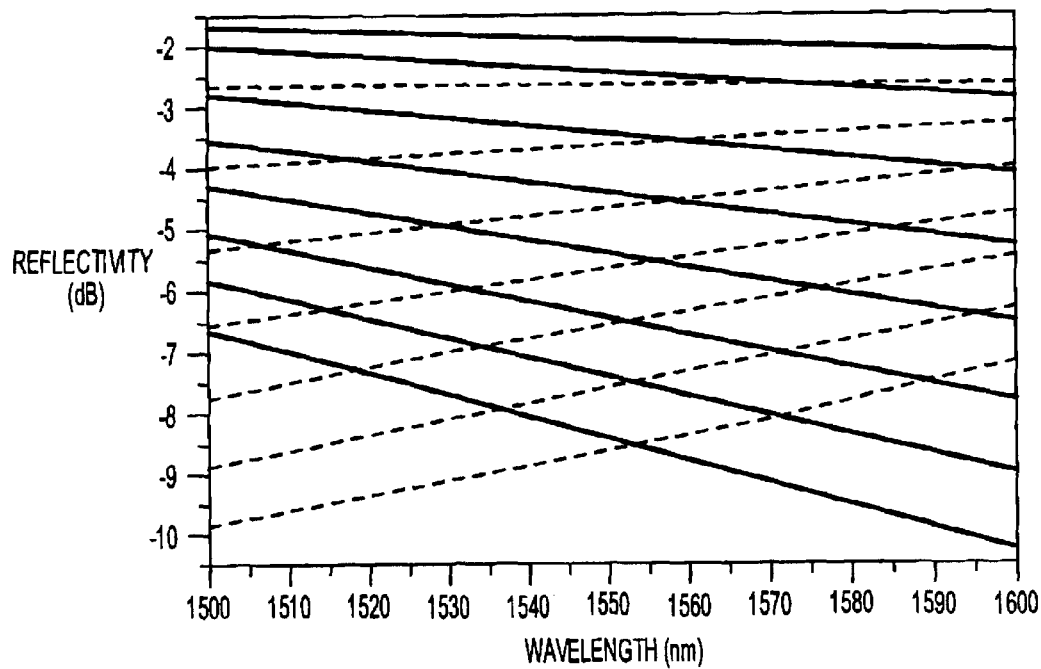
Figure 8:
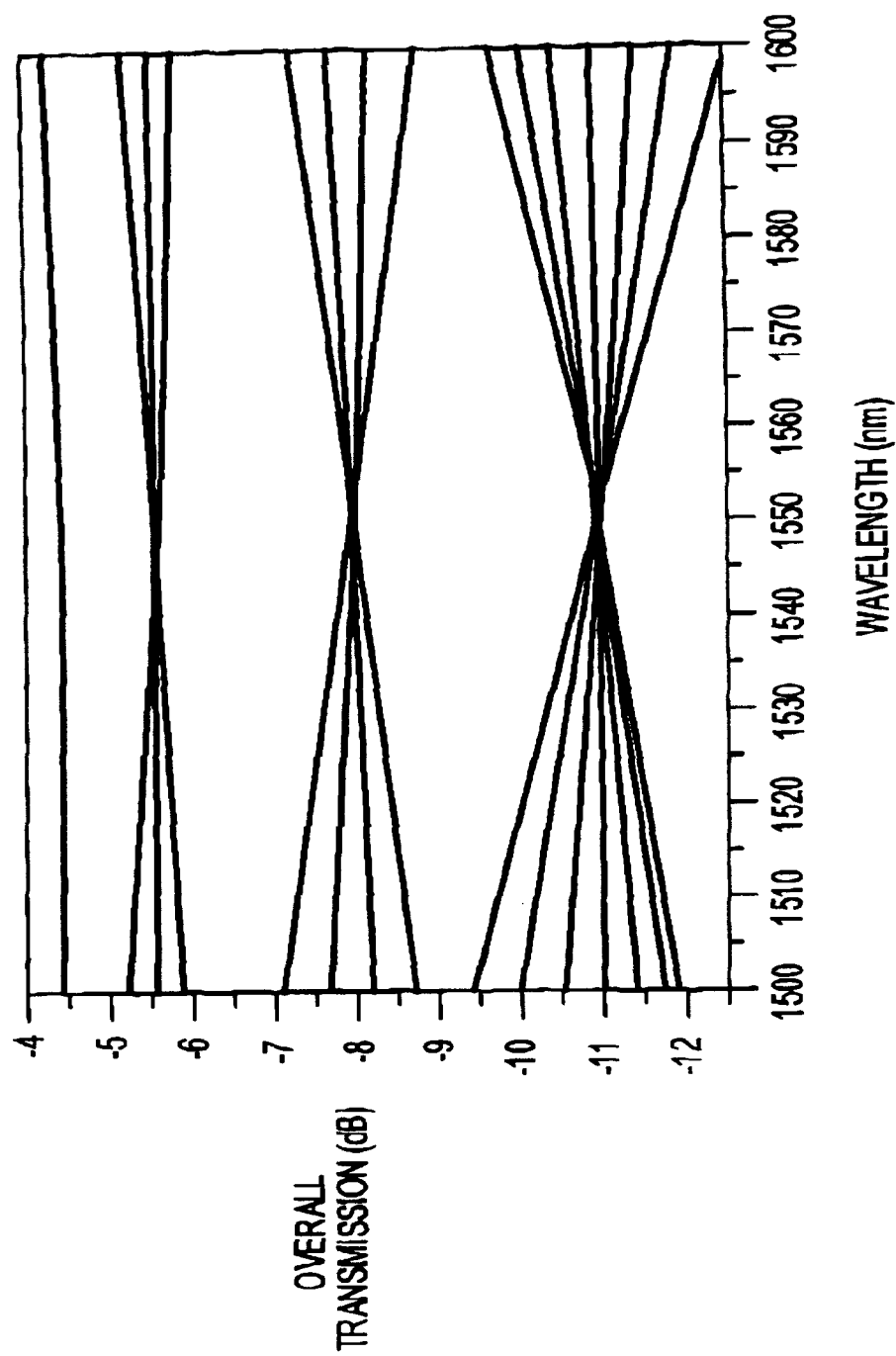

The second derivative of the attenuation spectra for a given air gap was plotted as a function of membrane constituent layer thicknesses. The result for an air gap of 1400 angstroms in the positive tilt unit was a contour plot shown as FIG. 6. The contour plot is similar to a topographical map, and the point of minimal curvature can be found by looking for the point of lowest value. In this instance, the curvature is minimized for top and bottom membrane layer thicknesses of 2,505 and 486 angstroms, respectively. Using the same process, minimum curvature thicknesses of 3,263 and 821 angstroms are determined for the negative tilt unit. FIG. 7 shows the spectra of the units with these thicknesses, and FIG. 8 shows the spectra of the cascaded device. The spectral tilts are linear.

Figure 9:
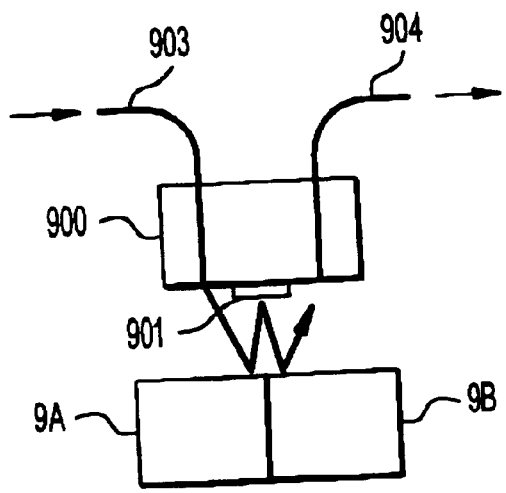
FIG. 9 illustrates an alternative embodiment of an optical modulator providing independent control of attenuation and tilt.

FIG. 9 schematically illustrates an alternative embodiment similar to that of FIG. 2 but using only one dual-fiber ferrule package 900 modified by disposing a mirror 901 between fibers 903 and 904. Light from input fiber 903 reflects from MARS unit 9A to mirror 901. From 901, the light reflects from unit 9B into output fiber 904. Attenuation and tilt control are achieved as in the FIG. 2 embodiment.

Figure 10:
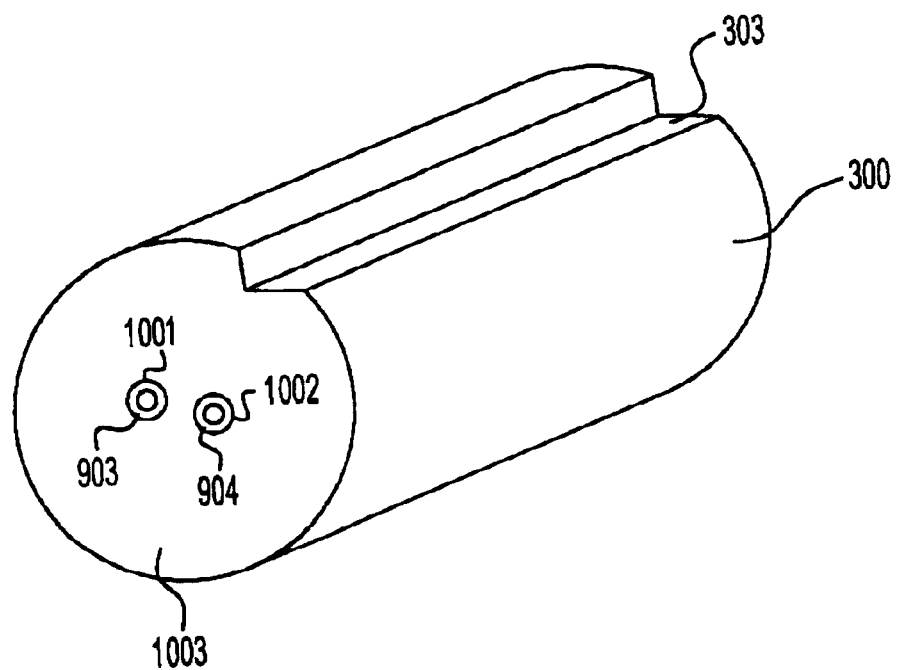
FIG. 10 illustrates a preferred form of the dual-fiber ferrule package useful in the embodiment of FIG. 9.

FIG. 10 illustrates a preferred form of a dual fiber ferrule package for use in the embodiment of FIG. 9. In essence, the rigid retaining member 300 has two holes 1001 and 1002 on opposite sides of the axis of symmetry. The holes are sized and positioned to maintain the two fibers 903 and 904 in close adjacency. And the bottom surface 1003 of member 300 is provided with a mirror finish to form mirror 901 of FIG. 9.

It is to be understood that the above-described embodiments are illustrative of only a few of the many possible specific embodiments which can represent applications of the principles of the invention. Numerous and varied other arrangements can be made by those skilled in the art without departing from the spirit and scope of the invention.

What is claimed:

1. An optical modulator for providing independent control of attenuation and spectral tilt across an optical signal comprising:

first and second micromechanical modulators, each of the first and second micromechanical modulators including a Fabry-Perot optical cavity between an optical membrane and a substrate and employing voltage-controlled movement of the membrane in relation to the substrate, the first micromechanical modulator having a positive reflectivity vs. wavelength spectral tilt across said signal and the second micromechanical modulator having a negative reflectivity vs. wavelength spectral tilt across said signal wherein the second micromechanical modulator is optically coupled to the first micromechanical modulator.

2. The modulator of claim 1 wherein said first and second MARS modulators are optically coupled by a length of optical fiber.

3. The modulator of claim 1 wherein said first and second MARS modulators are optically coupled by a reflector.

4. The modulator of claim 1 wherein said membrane comprises a plurality of layers of different material.

5. The modulator of claim 4 wherein the thicknesses of different layers of said plurality are chosen to produce a linear spectral tilt across said signal.

6. The modulator of claim 1 wherein said substrate comprises silicon and said membrane comprises layers of silicon nitride and polysilicon.

7. A WDM optical communications system comprising:

a WDM transmitter;

an optical fiber for receiving a WDM signal from said transmitter;

an optical amplifier for amplifying a signal on said fiber; and optically coupled to said fiber, an optical modulator for providing independent control of attenuation and spectral tilt across the WDM signal comprising first and second micromechanical modulators, each of the first and second micromechanical modulators including a Fabry-Perot optical cavity between an optical membrane and a substrate and employing voltage-controlled movement of the membrane in relation to the substrate, the first micromechanical modulator having a positive reflectivity vs. wavelength spectral tilt across the WDM signal and the second micromechanical modulator having a negative reflectivity vs. wavelength spectral tilt across said WDM signal, the second micromechanical modulator being optically coupled to the first micromechanical modulator.

* * * * *